United States Patent [19]

Takasu et al.

[11] Patent Number: 4,590,565
[45] Date of Patent: May 20, 1986

[54] IGNITION TIMING CONTROL FOR COMPENSATING KNOCK IN BOTH STEADY-STATE AND TRANSIENT STATE

[75] Inventors: Yasuhito Takasu, Toyohashi; Toshiharu Iwata, Aichi; Hiroshi Haraguchi; Katsuharu Hosoe, both of Kariya, all of Japan

[73] Assignee: Nippondenso Co., Ltd., Kariya, Japan

[21] Appl. No.: 500,868

[22] Filed: Jun. 3, 1983

[30] Foreign Application Priority Data

Jun. 9, 1982 [JP] Japan ................................ 57-99484

[51] Int. Cl.⁴ .............................................. F02P 5/04
[52] U.S. Cl. .................. 364/431.08; 123/425; 123/417
[58] Field of Search ............. 364/424, 431.08; 123/417, 425; 73/35

[56] References Cited

U.S. PATENT DOCUMENTS

| | | | |
|---|---|---|---|
| 4,240,388 | 12/1980 | Omori et al. | 123/425 |
| 4,347,820 | 9/1982 | Deleris | 123/425 |
| 4,357,918 | 11/1982 | Asano | 123/425 |
| 4,367,531 | 1/1983 | Furuhashi et al. | 73/35 |
| 4,413,599 | 11/1983 | Shigematsu et al. | 123/425 |
| 4,425,890 | 1/1984 | Yamaguchi | 123/417 |

Primary Examiner—Parshotam S. Lall
Attorney, Agent, or Firm—Cushman, Darby & Cushman

[57] ABSTRACT

The ignition timing of an internal combustion engine is controlled to an optimum by compensating for engine knock. A microcomputer includes a memory for storing steady-state and transient-state ignition timing variables which are derived as a function of an operating condition of the engine. If engine knock occurs during a steady running state, the stored steady-state ignition timing variable is trimmed and if engine knock occurs during a transient state, the stored transient-state ignition timing variable is trimmed. Ignition is caused to occur in response to the stored value of the trimmed steady-state or transient-state ignition variable according to the detected engine condition.

19 Claims, 9 Drawing Figures

IGNITION TIMING CONTROL FOR COMPENSATING KNOCK IN BOTH STEADY-STATE AND TRANSIENT STATE

BACKGROUND OF THE INVENTION

The present invention relates to ignition timing control which compensates for engine knocking conditions for purposes of improving the operating efficiency of an internal combustion engine.

A number of attempts have been made to mitigate undesirable circumstances that arise out of engine knocks by controlling the engine's ignition timing by feedback using a knocking sensor as a source of a feedback parameter. The ignition timing, which is usually determined as a function of engine speed and intake airflow, is trimmed incrementally in response to a signal from the knocking sensor so that ignition occurs at an angle retarded as much as possible to meet fuel economy and high operating efficiency. Microcomputers are conveniently used for generating a basic ignition timing variable as a function of sensed engine speed and intake airflow. The basic timing variable is trimmed incrementally by a trimming value that is derived in response to the presence of an engine knock and trimmed decrementally by a trimming value that is derived in response to the absence of engine knocks, so that ignition timing is corrected in a learning process and an optimum value is thus obtained.

However, during transient periods such as rapid acceleration, engine knock tends to occur more frequently than at other times and for this reason a large amount of correction is required during transient periods. The trimming value used during such transient periods completely updates the previously learned trimming value and therefore the previous learning process becomes useless for subsequent steady state operations and a new learning process must be initiated each time the engine operation switches from transient to steady state operations. Since the learning process takes some length of time to obtain an optimum value, the engine's operating efficiency and fuel economy are not optimum during relearning periods.

SUMMARY OF THE INVENTION

A primary object of the invention is therefore to provide an ignition control method and apparatus having separated learning processes for deriving trimming values independently with respect to different engine operating conditions and storing the independently derived variables for use in subsequent steady state operations, whereby the steady-state trimming value is unaffected by engine's transient conditions.

In a broader aspect, the invention provides a method which comprises detecting the presence of a steady state or a transient state of the engine, deriving a steady-state ignition timing variable in the presence of the steady state or a transient-state ignition timing variable in the presence of the transient state, and detecting the presence of an engine knock. The steady-state ignition timing variable is trimmed with a first trimming value in response to there being a simultaneous presence of the steady state and the engine knock or the transient-state ignition timing variable is trimmed with a second trimming value in response to there being a simultaneous presence of the transient state and the engine knock. The first and second trimming values stored in a memory for use in subsequent steady state and transient state, respectively. Ignition occurs in accordance with the trimmed steady-state ignition timing variable in the presence of the steady state or in accordance with the trimmed transient-state ignition timing variable in the presence of the transient state.

Preferably, the first, or steady-state trimming value is limited to a first maximum value when the latter is exceeded, and the second, or transient-state trimming value is limited to a second maximum value when the latter is exceeded, the second maximum value being greater than the first maximum value.

Preferably further, the second trimming value is updated to a value, which may be either a constant or a variable proportional to the steady-state trimming value, during a subsequent steady state.

BRIEF DESCRIPTION OF THE DRAWINGS

The present invention will be described in further detail with reference to the accompanying drawings, in which.

DETAILED DESCRIPTION

Figure 1:
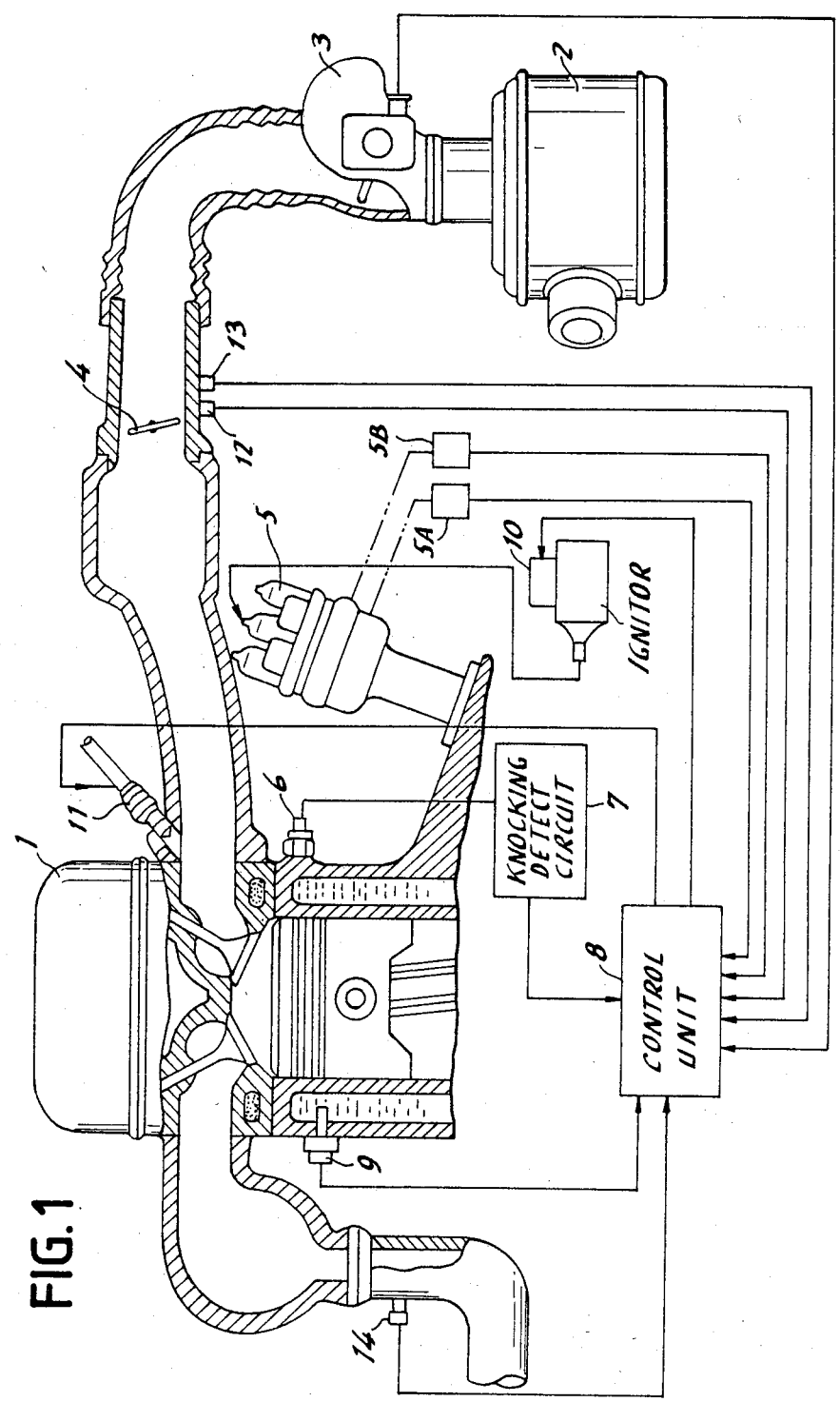
FIG. 1 is a schematic diagram of an internal combustion engine and an ignition control unit of the invention.

In FIG. 1, a four-cycle four-cylinder internal combustion engine 1 is partially illustrated. The engine includes an intake airflow sensor 3 for measuring the flow rate of air taken in through an intake pipe having an air cleaner 2 and a throttle valve 4. An ignition distributer 5 is shown as including a reference angle sensor 5A which generates a pulse responsively to a predetermined angular point advanced with respect to the top dead center and a crank angle sensor 5B which generates a pulse for every rotation of the engine crankshaft through a predetermined angle, typically 30 degrees. For purposes of controlling the ignition timing of the engine 1, various sensing devices are provided. These include a vibration sensor 6 mounted on a cylinder wall to generate a pulsating signal indicating the magnitude and frequency of engine oscillation, a knocking detecting circuit 7 which receives the pulsating signal from the sensor 6 to detect the knocking of the engine, an engine temperature sensor 9, and throttle position sensors 12 and 13 for detecting when the throttle 4 is in closed and fully open positions and generating therefrom idling and full-power signals, respectively. An oxygen sensor 14 is provided on the exhaust pipe of the engine to generate a signal indicating that the air-fuel ratio of mixture is on the rich or leaner side of stoichiometry.

Figure 2:
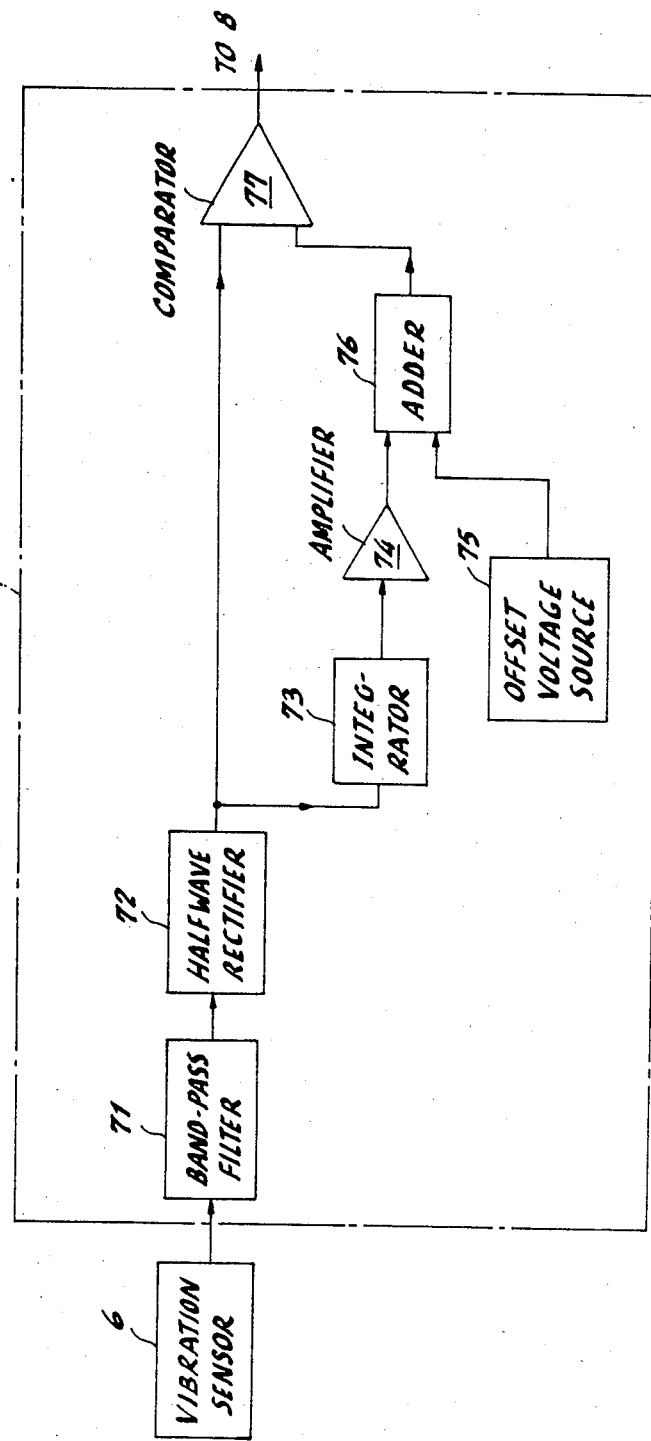
FIG. 2 is a block diagram of a knocking sensor of FIG. 1.

As illustrated in FIG. 2, the knocking detecting circuit 7 includes a band-pass filter 71 that passes those frequency components of the signal from the vibration sensor 6 which are characteristic of engine knocks and rejects all other frequency components. A halfwave rectifier 72 rectifies and applies the output of the bandpass filter 71 to a first input of a comparator 77. The rectifier 72 also applies its output to a reference voltage generator comprising an integrator 73 which derives an average value of the vibration sensor output, an amplifier 74 which intensifies the average value to an appropriate level, an offset voltage source 75 and an adder 76. To provide an suitable margin to accommodate noise fluctuations an offset voltage is generated in the source 6 and summed with the amplifier 74 output in the adder 76. The output of the adder 76 is fed to the second input of the comparator 77 as a reference. The output of the rectifier 72 is compared in the comparator with the reference voltage. When the latter is exceeded a pulse is generated at the output of the comparator.

Returning to FIG. 1, the output of the knocking detecting circuit 7 is coupled to a control unit 8 which is typically a microcomputer. The microcomputer 8 receives other signals from airflow sensor 3, reference angle sensor 5A, crank angle sensor 5B, throttle position sensors 12, 13 and oxygen sensor 14 and generates a fuel injection pulse to injectors 11 and an ignition pulse whose timing is determined according to the invention and applies it to an ignitor 10 including an ignition coil. A high tension voltage generated in the ignitor 10 is supplied to the distributer 5.

Figure 3:
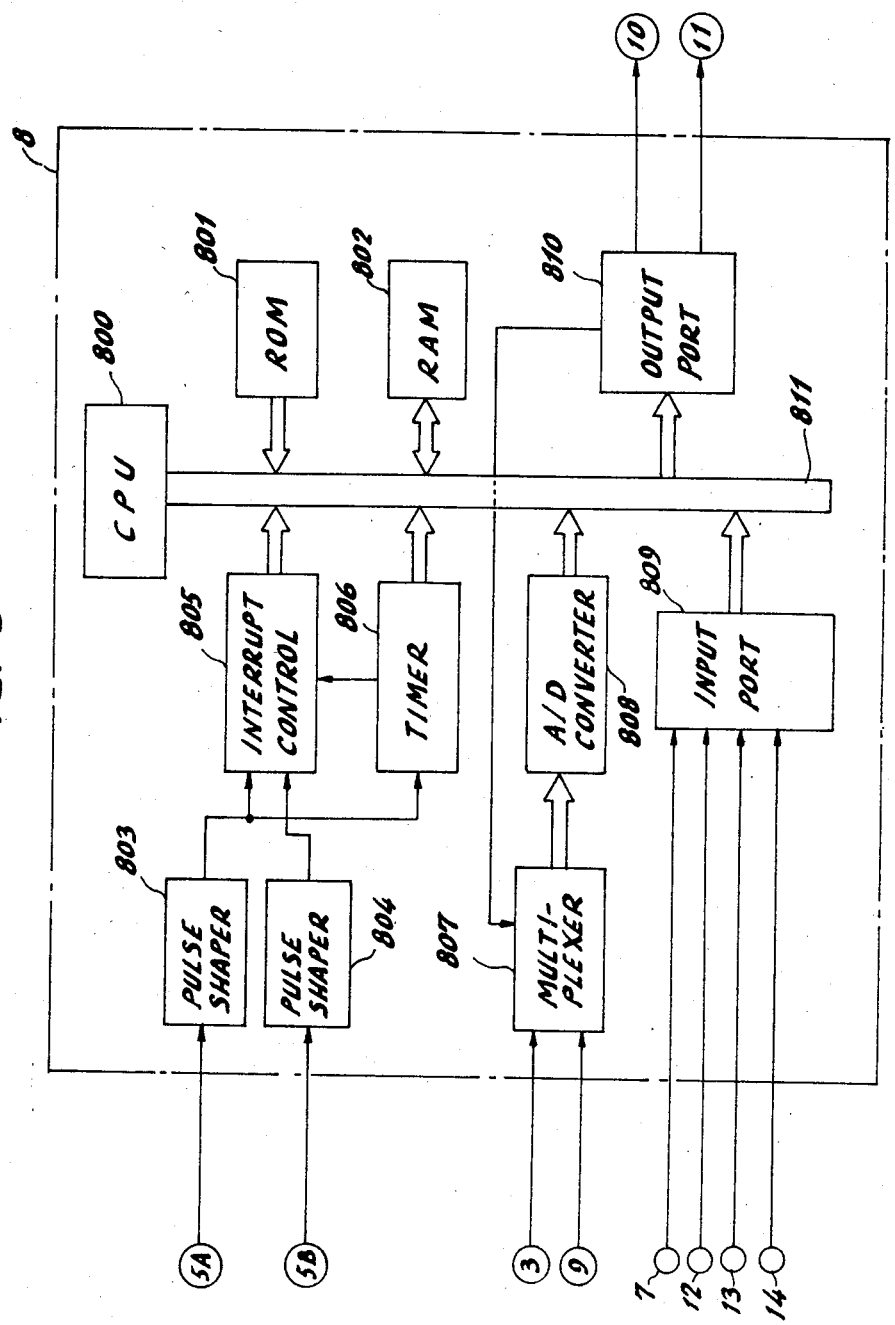
FIG. 3 is a block diagram showing the detail of the control unit of FIG. 1.

As shown in detail in FIG. 3, the microcomputer 3 comprises a microprocessor or central processing unit (CPU) 800. The CPU operates on data supplied through a bus 811 according to preprogrammed instructions stored in a read-only memory 801 with the aid of a random access memory 802. In the read-only memory 801 is stored a map of basic ignition timing data corresponding to per-crankshaft-revolution intake airflow data Q/N (where Q represents the intake airflow and N represents the engine speed) in locations addressible as a function of a combination of airflow datum Q and per-crankshaft airflow datum Q/N.

Pulses indicating engine crankshaft positions are supplied from reference sensor 5A and crank angle sensor 5B and shaped into sharply defined rectangular waveforms by pulse shapers 803 and 804, respectively, suitable for digital operations and fed to an interrupt control unit 805. The output of the reference angle sensor 5A is also coupled to a timer 806 which counts the CPU's 1-microsecond clock pulse and supplies a binary timing signal to the bus 811 and also to the interrupt control unit every time the engine crankshaft rotates past the reference angular position. The interrupt control unit 805 responds to a signal from the timer 806 by placing a request on the CPU that it derive a difference between the binary clock counts received successively from the timer 806 to serve as a measure of the period of time the crankshaft takes to complete a full revolution and hence the rotational speed of the engine 1 is determined. The output of the crank angle sensor 5B is generated every 30-degree crank angle with respect to the top dead center and utilized to derive a basic ignition timing datum or "variable".

Analog signals from airflow sensor 3 and temperature sensor 9 are applied to an analog multiplexer 807 which selectively applies the input signals to an analog-to-digital converter 808 under the control of a signal from an output port 810. Digital signals from knocking detecting circuit 7, throttle position sensors 12, 13 and oxygen sensor 14 are applied to an input port 809. The outputs of analog-digital converter 808 and input port 809 are fed through bus 811 to the CPU to derive fuel ignition and injection data which are conditioned into appropriate pulses in the output port 810 and applied to ignitor 10 and fuel injectors 11.

Figure 4:
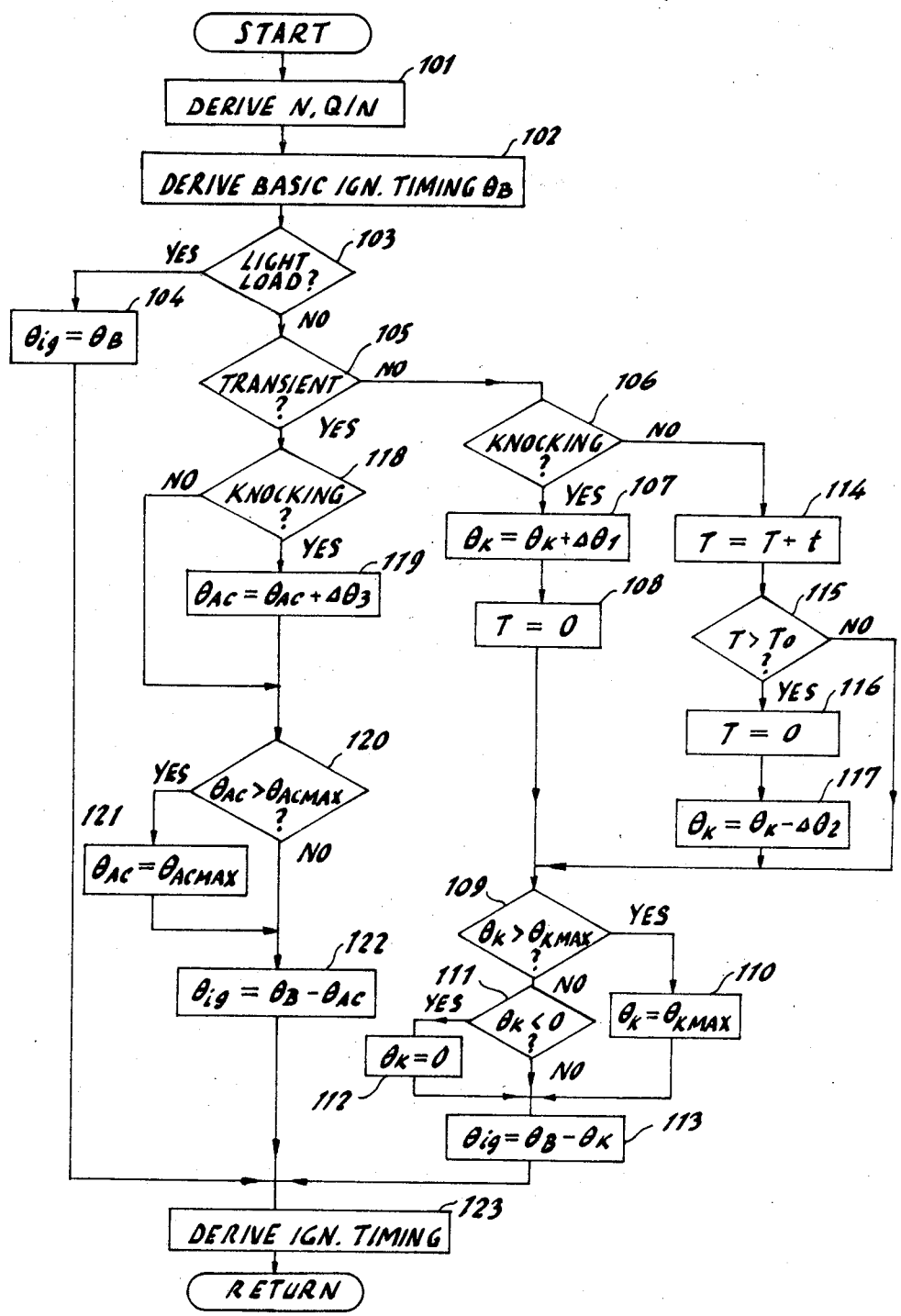
FIG. 4 is a flowchart describing the programmed steps of the microcomputer according to a first preferred embodiment.

Referring to FIG. 4, a flowchart describing the programmed instructions of the microcomputer 8 is illustrated. The program execution starts at Step 101 in response to an interrupt command issued from the timer 806 by interrupting a main routine which includes various engine control algorithms. In the Step 101, the microprocessor derives an engine speed datum N and an airflow datum Q from the outputs of airflow sensor 3 and reference angle sensor 5A and computes on them to derive a datum Q/N, and goes to a Step 102 to derive a basic ignition timing variable $\theta_B$ by addressing the read-only memory as a function of the derived N and Q/N values. At Step 103, the microcoprocessor checks to see if the engine is under light load. If the engine is under light load in which engine knock is not likely to occur, the program execution exits to a Step 104 to set an ignition timing register $\theta$ig to $\theta_B$ and goes to a Step 123 to generate an ignition timing pulse in accordance with the datum $\theta$ig stored in the ignition register.

Figure 6:
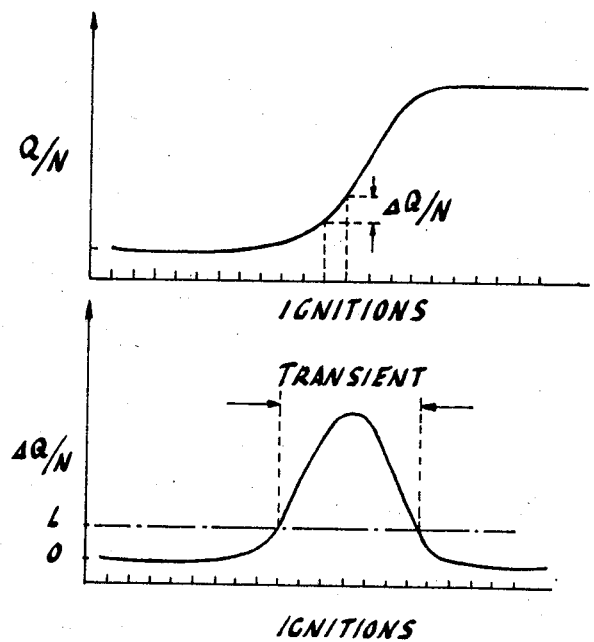
FIG. 6 is an explanatory view associated with the detection of a transient condition.

According to a feature of the invention, a Step 105 is provided. If the engine is under heavy load, the step 105 will be executed by checking if the engine is under a transient condition such as acceleration or deceleration. More specifically, the transient condition is sensed by detecting the difference between successive values of per-crank-revolution airflow Q/N and checking if the difference is greater than a reference value L/N, where L is a constant (see FIG. 6). If there is no transient condition, the microprocessor exits to a "steady state" trimming subroutine commencing at Step 106 to correct a steady-state retard trimming variable $\theta_K$, and if a transient condition is detected, the microprocessor advances to a "transient state" trimming subroutine which commences at Step 118 to correct a transient-state retard trimming variable $\theta_{AC}$.

In the Step 106 of the steady-state subroutine, the presence or absence of an engine knock is detected. If present, a trimming value $\Delta\theta_1$ is added to the steady-state retard trimming variable $\theta_K$ at Step 107. At Step 108, an advance angle timer T is cleared and at Step 109, the microprocessor checks if the steady-state retard trimming variable is smaller than a predetermined maximum value $\theta_{KMAX}$ which is the limit value for knocking-free steady-state engine operations. If the maximum value is exceeded, the trimming variable $\theta_K$ is set equal to that maximum limit at Step 110, and if not, the polarity of the trimming variable $\theta_K$ is checked at Step 111 if it is negative or positive. If negative, the stead-state trimming variable is reset to zero at Step 112, and if positive, the trimming variable is left uncorrected. Thus, the trimming variable $\theta_K$ is set to a value in a range between zero and $\theta_{KMAX}$. A Step 113 now follows to trim the basic ignition timing datum $\theta_B$ by subtracting the trimming variable $\theta_K$ therefrom to derive the ignition timing $\theta$ig, thus terminating the steady state knock compensation subroutine. The Step 113 is followed by Step 123 to provide ignition in response to the $\theta$ig datum derived at Step 113.

If engine knock is not detected in the Step 106, then the microprocessor exits to a Step 114 to increment the advance angle timer T by "t" and proceeds to a Step 115 to check if T is is greater than a constant To to reset T to zero at Step 116 which is followed by a Step 117 to trim the $\theta_K$ variable by subtracting a value $\Delta\theta_2$ from it before it proceeds to the Step 109. If T is smaller than To, the program execution exits from Step 115 to Step 109. Therefore, as long as the absence of an engine knock continues, the timer T is incremented to measure the length of such condition and reset to zero when the measured length of time reaches To. The steady state retard trimming variable $\theta_K$ thus decreases stepwisely as a function of time until it reaches zero if knock-free condition continues and increases stepwisely in response to the occurrence of a knocking condition.

Upon acceleration, a transient condition is detected at Step 105 and the microprocessor exits to a Step 118 where it checks for the presence and absence of engine knock. If present, a Step 119 is executed by adding a trimming value $\Delta\theta_3$ to the transient retard trimming variable $\theta_{AC}$ and a Step 120 follows, and if absent, the Step 118 is immediately followed by Step 120. The trimming variable $\theta_{AC}$ has a particular value suitable for compensating for knocking conditions that occur frequently during transient periods.

In Step 120, the trimming variable $\theta_{AC}$ is checked against a predetermined maximum value $\theta_{ACMAX}$. If the latter is exceeded, the $\theta_{AC}$ variable is reset to the maximum value $\theta_{ACMAX}$ at Step 121, and if not, this variable is left uncorrected. Correction of the basic ignition angle $\theta_B$ is made by the transient trimming variable $\theta_{AC}$ by subtracting it therefrom at Step 122, thus terminating the transient knocking compensation subroutine.

Since the trimming variables $\theta_K$ and $\theta_{AC}$ for steady and transient conditions have particular variables and independently corrected, the steady state trimming variable which has been updated over the past steady period through a learning process is unaffected during subsequent transient operations and is readily available for use at the instant the engine enters a steady state again. The limitation of the trimming variables $\theta_K$ and $\theta_{AC}$ by again. The limitation of the trimming variables $\theta_K$ and $\theta_{AC}$ by different maximum values $\theta_{KMAX}$ and $\theta_{ACMAX}$ which are appropriately chosen for steady and transient states, respectively, serves to effectively suppress the engine knock that might occur particularly during periods of rapid acceleration.

Figure 7:
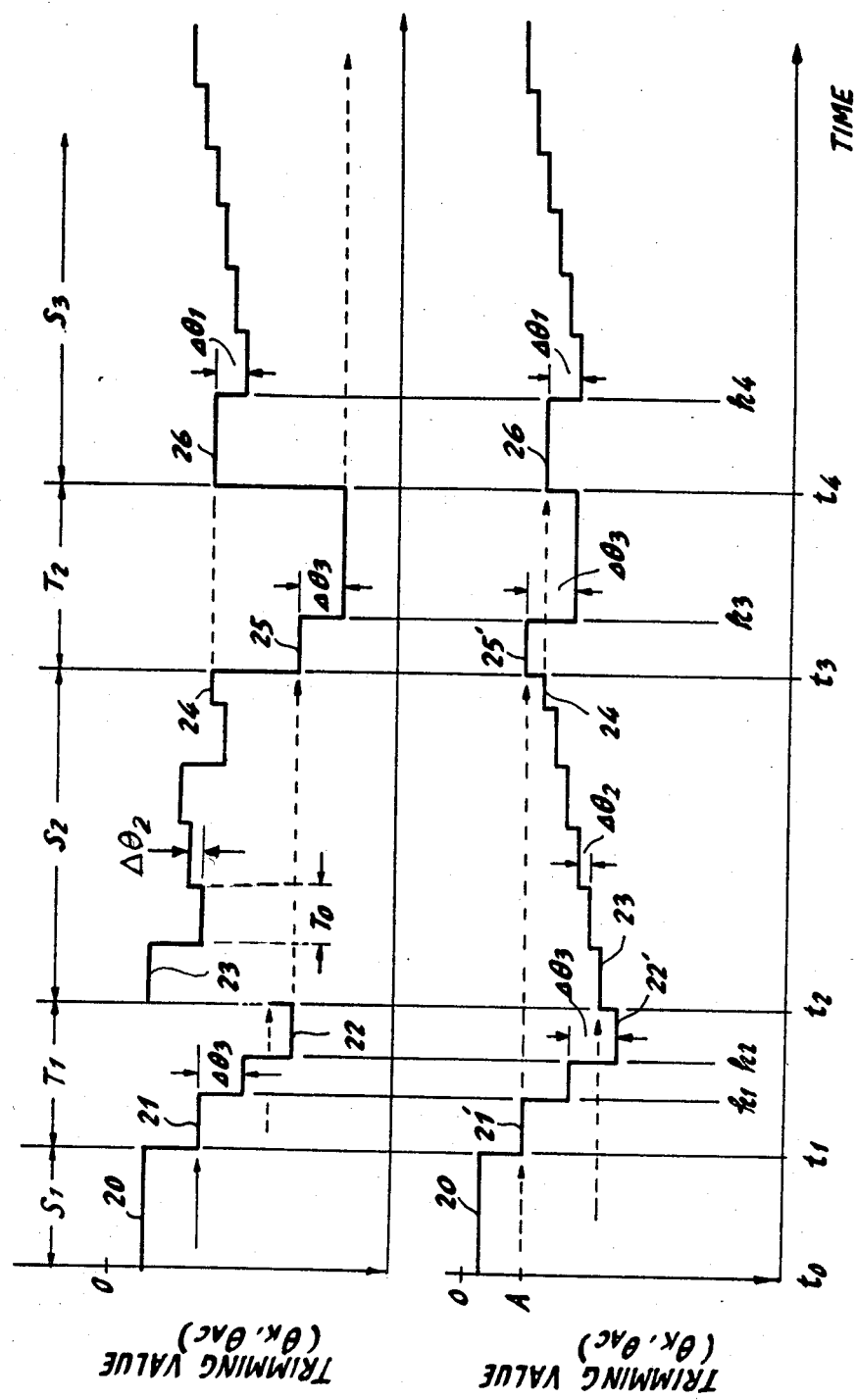
FIG. 7 is a timing diagram useful for describing the operation of the invention.

The advantageous effect of the invention will be best understood with reference to FIG. 7. For purposes of illustration, the engine is assumed to have been operated on steady and transient (rapid acceleration) modes in succession as indicated at S1, T1, S2, T2 and S3. The steady-state retard trimming variable $\theta_K$ initially assumes a value indicated at 20 during the steady state period $t_0$ to $t_1$. This value is switched at time $t_1$ to a transient-state trimming variable $\theta_{AC}$ shown at 21 which has been derived during a previous transient period. During this period engine knocks $k_1$ and $k_2$ are assumed to occur in succession. The trimming variable $\theta_{AC}$ is thus incremented by $\Delta\theta_3$ in a direction away from the zero trimming value until it reaches a level 22. At time t2, the trimming variable switches to a steady-state variable $\theta_K$ shown at 23 which corresponds to the level 20 obtained during the previous steady state period $t_0$ to $t_1$. If no engine knock occurs during the period $t_2$ to $t_3$, the trimming variable $\theta_K$ is decremented stepwisely by $\Delta\theta_2$ at intervals To until it reaches a level 24. At time t3, the trimming variable switches to a level 25 which corresponds to the level 22 obtained during the transient period T1. In response to an engine knock k3, the trimming variable $\theta_{AC}$ is incremented by $\Delta\theta_3$ and, at time t4 the engine enters a transient-state, the trimming variable switches to a level 26 corresponding to the level 24. An engine knock k4 causes the trimming variable $\theta_K$ to be incremented by $\Delta\theta_1$. Thus, the learning process during steady state periods is unaffected by knocking compensations during transient periods.

Figure 5:
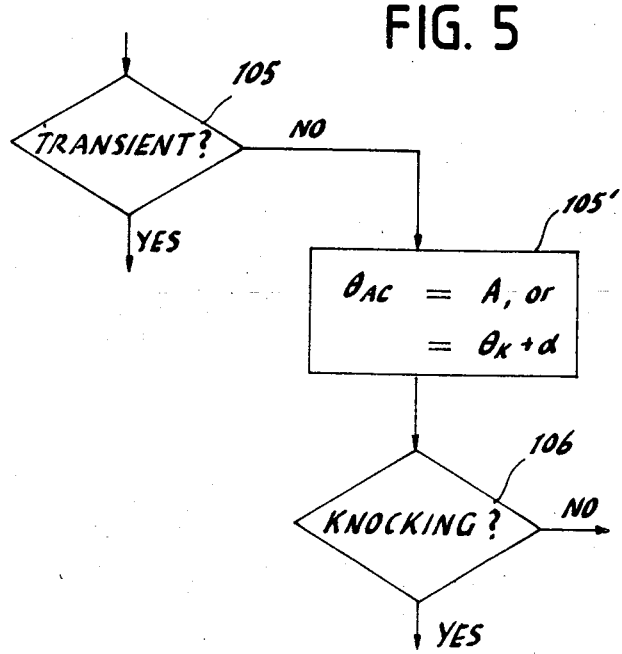
FIG. 5 is a flowchart of the microcomputer according to a modified embodiment.

Engine knock is likely to occur during rapid accelerations and it requires a larger amount of trimming variable than is required for knocking compensation during steady state periods. It is thus likely that a trimming variable $\theta_{AC}$ stored in a previous transient period is too large for engine knock compensation during subsequent transient period, causing a loss of engine output power. To overcome this disadvantage, the flowchart of FIG. 3 is modified in a manner as shown in FIG. 5 by including an additional Step 105' between Steps 105 and 106. When a steady state is detected at Step 105, the microprocessor exits to the Step 105' to update the transient trimming variable $\theta_{AC}$ with a constant value A or a variable trimming variable $\theta_K+\alpha$, where $\alpha$ is a constant.

As illustrated in FIG. 7, the transient trimming variable during periods T1 and T2 initially assumes levels 21' and 25' respectively which correspond to the constant value A (or $\theta_K+\alpha$) so that excessive amount of knocking compensation is avoided, while the steady-state trimming variable switches to the previous value and remains unaffected by compensation during transient periods.

Figure 8:
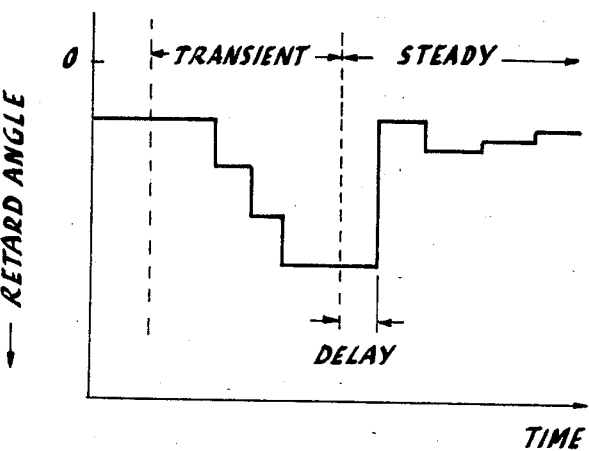
FIGS. 8 and 9 are timing diagrams of further modifications of the invention.

According to a further modification of the invention, a delay time is introduced at the instant of switching between steady and transient modes as illustrated schematically in FIG. 8.

Figure 9:
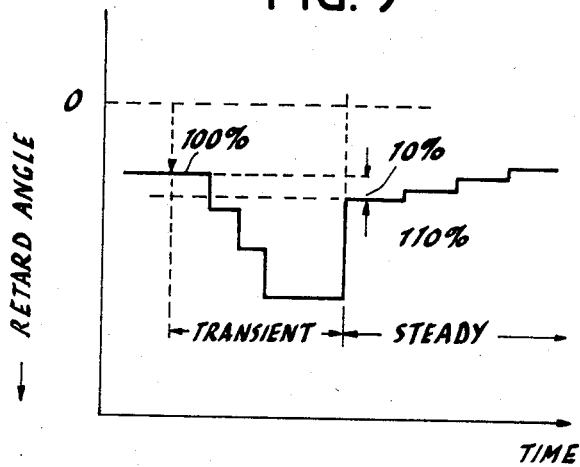

Another modification involves proportioning the steady-state trimming variable $\theta_K$ to a value, typically 110% of the stored value prior to using it at the start of the subsequent steady run as shown in FIG. 9. A delay time may also be introduced in addition to the proportioning of the previous steady state trimming variable.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for controlling ignition timing of an internal combustion engine, comprising the steps of:
    (a) detecting whether the engine is operating in a steady state or in a transient state;
    (b) deriving a steady-state ignition timing variable when the engine is operating in steady state and deriving a transient-state ignition timing variable when the engine is operating in transient state;
    (c) detecting the presence of an engine knock;
    (d) trimming said steady-state ignition timing variable with a first trimming value in response to there being a simultaneous presence of said steady state and said engine knock or trimming said transient-state ignition timing variable with a second trimming value in response to there being a simultaneous presence of said transient state and said engine knock;
    (e) storing said first and second trimming values in a memory; and
    (f) causing ignition to occur in accordance with the trimmed steady-state ignition timing variable in the presence of said steady state or in accordance with said trimmed transient-state ignition timing variable in the presence of said transient state.

2. A method as claimed in claim 1, further comprising the steps of limiting said first trimming value to a first maximum value and limiting said second trimming value to a second maximum value which is smaller than said first maximum value.

3. A method as claimed in claim 1, further comprising the step of updating, during steady state engine operation, said second trimming value in accordance with a predetermined function.

4. A method as claimed in claim 1, further comprising the step of updating, during steady state engine operation, said second trimming value in accordance with a function of a value proportional to said first trimming value.

5. A method for controlling the ignition timing of an internal combustion engine having a memory in which first and second trimming variables are stored, comprising the steps of:
   (a) generating an ignition timing variable as a function of an operating condition of said engine;
   (b) detecting whether said engine is operating in a steady state or in a transient state;
   (c) detecting when said engine is knocking;
   (d) if said steady state and the engine knocking are detected, varying said stored first trimming variable by a first predetermined quantity;
   (e) if said transient state and the engine knock are detected, varying said stored second trimming variable by a second predetermined quantity;
   (f) trimming said ignition timing variable by said varied first trimming variable if said steady state is detected or by said varied second trimming variable if said transient state is detected; and
   (g) causing ignition to occur in accordance with said trimmed ignition timing variable.

6. A method as claimed in claim 5, further comprising the steps of:
   limiting said first stored trimming variable to a first maximum value; and
   limiting said second stored trimming variable to a second maximum value which is greater than said first maximum value.

7. A method as claimed in claim 5, further comprising the step of updating said second stored trimming variable with a predetermined value during said steady state.

8. A method as claimed in claim 5, further comprising the step of updating said second stored trimming variable with a value proportional to said first stored trimming variable during said steady state.

9. A method as claimed in claim 5, further comprising the step of introducing a delay time in response to the detection of said steady state before said ignition timing variable is trimmed.

10. A method as claimed in claim 5, further comprising the step of introducing a delay time in response to the detection of said transient state before said ignition timing variable is trimmed.

11. A method as claimed in claim 5, further comprising the step of changing said first stored trimming variable according to a predetermined function in response to said engine switching from transient state operation to a steady state operation.

12. A method as claimed in claim 5, further comprising the step of changing said second stored trimming variable according to a predetermined function in response to said engine switching from steady state operation to transient state operation.

13. Apparatus for controlling the ignition timing of an internal combustion engine, comprising:
   means for detecting an engine operating parameter indicative of the load of said engine;
   a knocking sensor for detecting when said engine is knocking;
   memory means for storing therein first and second trimming variables; and
   control means for detecting the rate of variation of said detected operating parameter to determine whether said engine is operating in a steady state or in a transient state, generating an ignition timing variable as a function of said detected engine operating parameter, trimming said ignition timing variable with said first or second stored trimming variable depending on whether said stead state or said transient state is detected, respectively, and causing ignition to occur in accordance with said trimmed timing variable.

14. Apparatus as claimed in claim 13, wherein said control means comprises a microcomputer programmed to execute the following steps:
   (a) generating an ignition timing variable as a function of said detected operating parameter;
   (b) detecting the rate of variation of said detected operating parameter to determine whether said engine is in a steady state or in a transient state;
   (c) detecting when said engine is knocking;
   (d) if said steady state is detected, trimming said ignition timing variable in response to the detection of the engine knock by said stored first trimming variable;
   (e) if said transient state is detected, trimming said ignition timing variable in response to the detection of said engine knock by said stored second trimming variable;
   (f) causing ignition to occur in accordance with said trimmed ignition timing variable;
   (g) repeating the steps (a) to (c);
   (h) varying said stored first trimming variable by a first predetermined quantity;
   (i) repeating the step (d);
   (j) varying said stored second trimming variable by a second predetermined quantity; and
   (k) repeating the steps (e) and (f).

15. Apparatus as claimed in claim 14, wherein said microcomputer is further programmed to execute the steps of:
   limiting said varied first trimming variable to a first maximum value; and
   limiting said varied second trimming variable to a second maximum value which is greater than said first maximum value.

16. Apparatus as claimed in claim 14, wherein said microcomputer is further programmed to execute the step of updating said varied second trimming variable with a predetermined constant value during a subsequent steady state.

17. Apparatus as claimed in claim 14, wherein said microcomputer is further programmed to execute the step of updating said second stored trimming variable with a value proportional to said varied first trimming variable during a subsequent steady state.

18. Apparatus as claimed in claim 13, wherein said microcomputer is further programmed to execute the step of decrementing said stored first trimming variable by a predetermined value in response to the occurrence of ignition during said steady state.

19. A method for controlling ignition timing of an internal combustion engine, comprising the steps of:
   (a) detecting engine operating parameters at least including engine speed and intake air amount;
   (b) deriving a basic ignition timing as a function of the detected engine operating parameters;
   (c) detecting whether said engine is operating in a steady state or in a transient state in accordance with the rate of variation of intake air amount per one engine revolution;
   (d) deriving a steady-state trimming value when said engine is operating in said steady state and a transient-state trimming value when said engine is operating in said transient state;
   (e) detecting the presence of an engine knock;
   (f) in response to the detection of said steady state and the presence of said engine knock, varying said steady-state trimming value by a predetermined value, and in response to the detection of said transient state and the presence of said engine knock, varying said transient-state trimming value by a predetermined value;
   (g) storing said steady-state and transient-state trimming values in a memory;
   (h) respectively updating the stored trimming values in response to the variations of said trimming values;
   (i) correcting said basic ignition timing in accordance with the updated steady-state trimming value during said steady state engine operation and in accordance with the updated transient-state trimming value during said transient state engine operation;
   (j) when engine operation changes from a transient state to a steady state, correcting said basic ignition timing initially in accordance with the steady-state trimming value stored in the previous steady state, and when engine operation changes from a steady state to a transient state, correcting said basic ignition timing initially in accordance with the transient-state trimming value stored in the previous transient state; and
   (k) causing ignition to occur in accordance with the corrected ignition timing.

* * * * *